US006325403B1

(12) United States Patent
Brutger

(10) Patent No.: US 6,325,403 B1
(45) Date of Patent: Dec. 4, 2001

(54) HELICOPTER DOLLY

(76) Inventor: Wayne A. Brutger, 7975 River Rd., NE., Rice, MN (US) 56367

( * ) Notice: Subject to any disclaimer, the term of this patent is extended or adjusted under 35 U.S.C. 154(b) by 0 days.

(21) Appl. No.: 09/619,298

(22) Filed: Jul. 19, 2000

(51) Int. Cl.$^7$ ................................ B62B 7/02; B62D 13/00
(52) U.S. Cl. ........................................ 280/444; 280/47.24
(58) Field of Search ..................... 280/442–445, 280/63, 47.17, 47.19, 47.24, 47.27, 47.28, 402

(56) References Cited

U.S. PATENT DOCUMENTS

| | | | | |
|---|---|---|---|---|
| 3,477,742 | * | 11/1969 | Barrington | 280/444 |
| 4,033,422 | * | 7/1977 | Benning | 180/904 |
| 4,134,601 | * | 1/1979 | Propst | 280/444 |
| 4,223,856 | * | 9/1980 | Divencenzo | 180/904 |
| 4,397,254 | * | 8/1983 | Deady | 244/116 |
| 4,488,612 | * | 12/1984 | Patterson | 180/14.1 |
| 4,516,744 | * | 5/1985 | Burnside | 244/17.17 |
| 5,056,981 | * | 10/1991 | Knowles | 180/19.1 |
| 5,135,346 | * | 8/1992 | Roach | 180/148 |
| 5,655,733 | * | 8/1997 | Roach | 244/17.17 |
| 5,791,593 | * | 8/1998 | Warren, III | 244/17.17 |

* cited by examiner

Primary Examiner—Brian L. Johnson
Assistant Examiner—Matthew Luby
(74) Attorney, Agent, or Firm—Moore & Hansen

(57) ABSTRACT

A dolly for transporting a helicopter across the ground is herein disclosed. The dolly comprises a pair of steerable wheel assemblies that are affixed to the respective ends of an axle. The axle has coupled thereto a pair of clamping assemblies that secure the skids of a helicopter to the dolly. A tow bar is coupled to the axle and also to a linkage that is connected between the steering mechanisms of the two steerable wheel assemblies for steering the dolly. To move the helicopter, the dolly is inserted beneath the forward ends of the helicopter's skids and coupled thereto. The helicopter is then supported upon the dolly and upon the rear ends of the helicopter's skids which may also be provided with wheels. The dolly is adjustable to compensate for helicopters having skids spaced at various distances.

17 Claims, 4 Drawing Sheets

HELICOPTER DOLLY

BACKGROUND OF THE INVENTION

The present invention relates to a steerable dolly for moving helicopters.

Unlike conventional fixed-wing aircraft, helicopters are capable of vertical take-off and landings, thereby obviating the need for landing gear or wheels. As a helicopter does not need wheels to fly, most helicopters, and especially small one- and two-man models, are supported on an undercarriage that includes a pair of parallel skids. However, once they have landed, helicopters can be difficult to move, as the skids upon which they are supported are not well adapted for moving the helicopters about. Skid mounted helicopters have traditionally been moved by either dragging them across the ground, landing them on a trailer which then may be used to move the helicopter, or by securing a single wheel to the rear-most portion of each of the helicopter skids. This latter mode of moving a helicopter has been useful only on smaller helicopters as only the smaller helicopters are small enough to be moved in this manner. Moving the helicopter using this method is accomplished by forcing the tail of a helicopter equipped with the skid mounted wheels towards the ground, thereby lifting the nose and tilting the weight of the helicopter onto the skid mounted wheels. The helicopter is then rolled on its wheels to its new location. The problem with this mode of moving a helicopter is that it is strenuous and quite difficult to move a helicopter in this manner over unpaved surfaces. The relatively small wheels are not able to negotiate grass, mud, or ruts that may be present in many airfields where helicopters are kept.

Therefore, it is object of the present invention to disclose a steerable dolly, which will permit a pilot or ground crewman to move a landed helicopter with ease over varying terrain. These and other objectives and advantages of the invention will appear more fully from the following description, made in conjunction with the accompanying drawings wherein like reference characters refer to the same or similar parts throughout the several views.

BRIEF SUMMARY OF THE INVENTION

A dolly which meets the objectives set forth above comprises a pair of steerable wheel assemblies affixed to the respective ends of an axle, a pair of clamping assemblies that are coupled to the axle and which secure the skids of the helicopter thereto, and a tow bar that is rotatively coupled to the axle and to the wheel assemblies for towing and steering the dolly. Preferably, the axis of the axle of the dolly will be vertically offset from an axis passing through the center of the tires of the wheel assemblies, i.e. the axle will be lower than the centers of the wheels.

The tow bar itself comprises an actuating link that is rotatively coupled to the axle and to a steering linkage that is coupled between the wheel assemblies. A tongue is hingedly coupled to the actuating link such that the tongue may pivot toward and away from the helicopter. The tongue of the tow bar typically has a connecting mechanism such as a D-ring for hitching the dolly to a towing vehicle and/or a handle.

Each of the clamping assemblies that secures one of a helicopter's skids to the dolly essentially comprises a pair of opposable clamping elements in which one of the clamping elements is rotatable between a first, open position and a second, closed position. The clamping elements are constructed and arranged to that when the clamping elements are in their second, closed position, they will be able to clamp therebetween a skid of the helicopter. A locking device is provided for maintaining the clamping elements in their second, closed position so that the skids of the helicopter will remain coupled to the dolly during transport.

Where the distance between the skids of a helicopter or helicopters may vary by make or model or through deformation of the undercarriage of the helicopter, the clamping assemblies may be adjustably coupled to the axle of the dolly. Alternatively or in addition to adjustably coupling the clamping assemblies to axle of the dolly, the axle can be provided with a telescoping joint that permits the length of the axle to be altered as needed.

The steerable wheel assemblies of the dolly include a tire mounted upon a rim that is coupled to a wheel axle that is itself secured to a vertical spindle. The vertical spindle is rotatable about a vertical axis such that the rotation of the vertical spindle causes the tire to be steered in the direction of the rotation of the spindle. The vertical spindle of each wheel assembly is actuated by a pitman arm that is coupled thereto. In order to steer the tires of the wheels assemblies in conjunction with one another, the respective pitman arms are coupled together by a linkage that is also coupled to the tow bar of the dolly.

An alternate embodiment of the present invention substitutes swivel wheels similar to those on an office chair for the steerable wheel assemblies described above.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
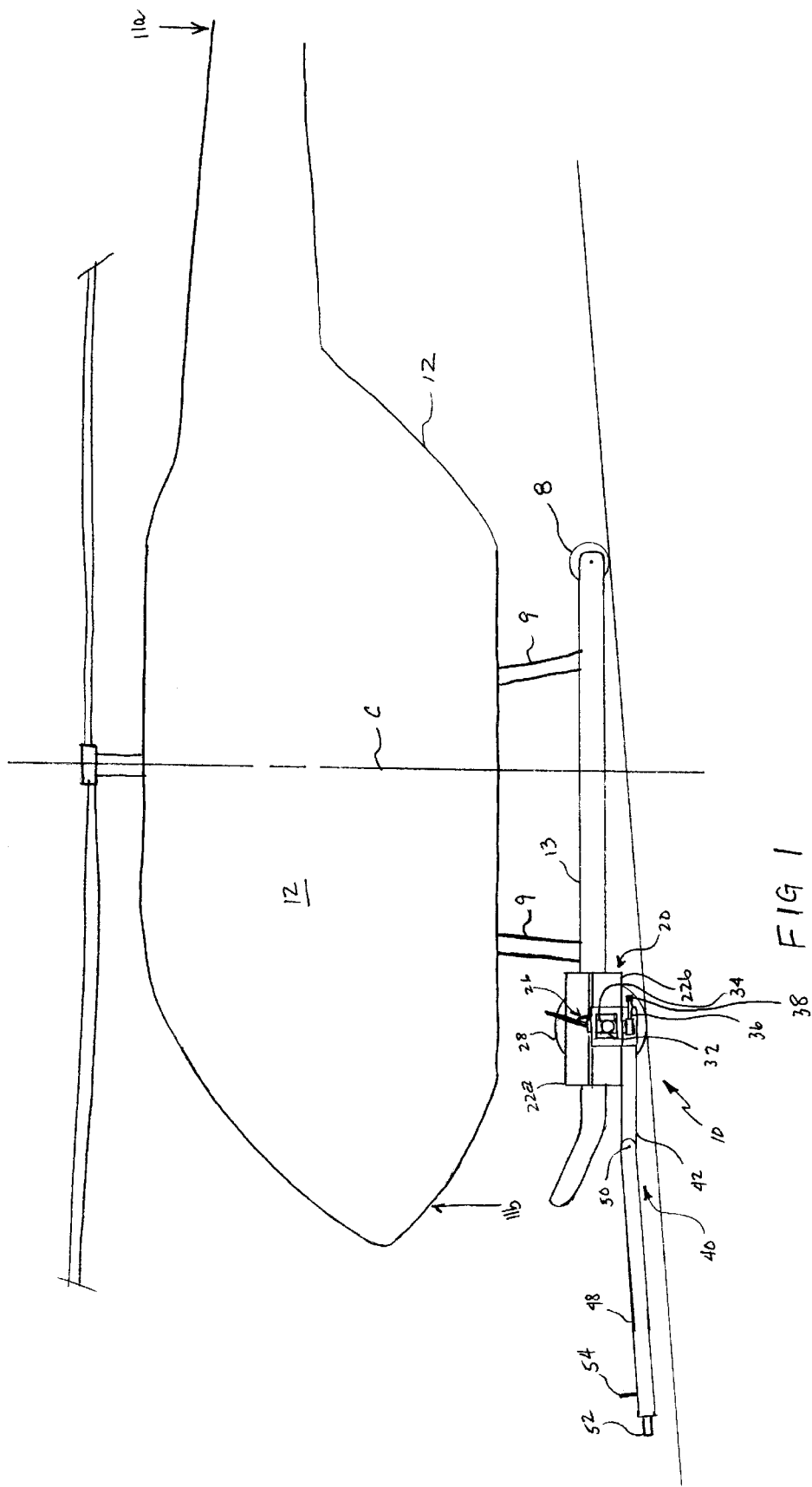
FIG. 1 is a side elevational view of a helicopter mounted upon a dolly of the present invention, the dolly having one of the wheels thereof removed for clarity.

The steerable dolly 10 of the present invention is constructed and arranged to support a small helicopter 12 thereon so as to allow the helicopter 12 to be moved from place to place once it has landed as illustrated in FIG. 1. The helicopter 12 in FIG. 1 is supported on an undercarriage comprising front and rear vertical struts 9 and right and left skids 13. Smaller helicopter such as helicopter 12 of FIG. 1 are often provided with wheels 8 at the rearmost end of skids 13 for the purpose of moving the helicopter as described above.

Figure 2:
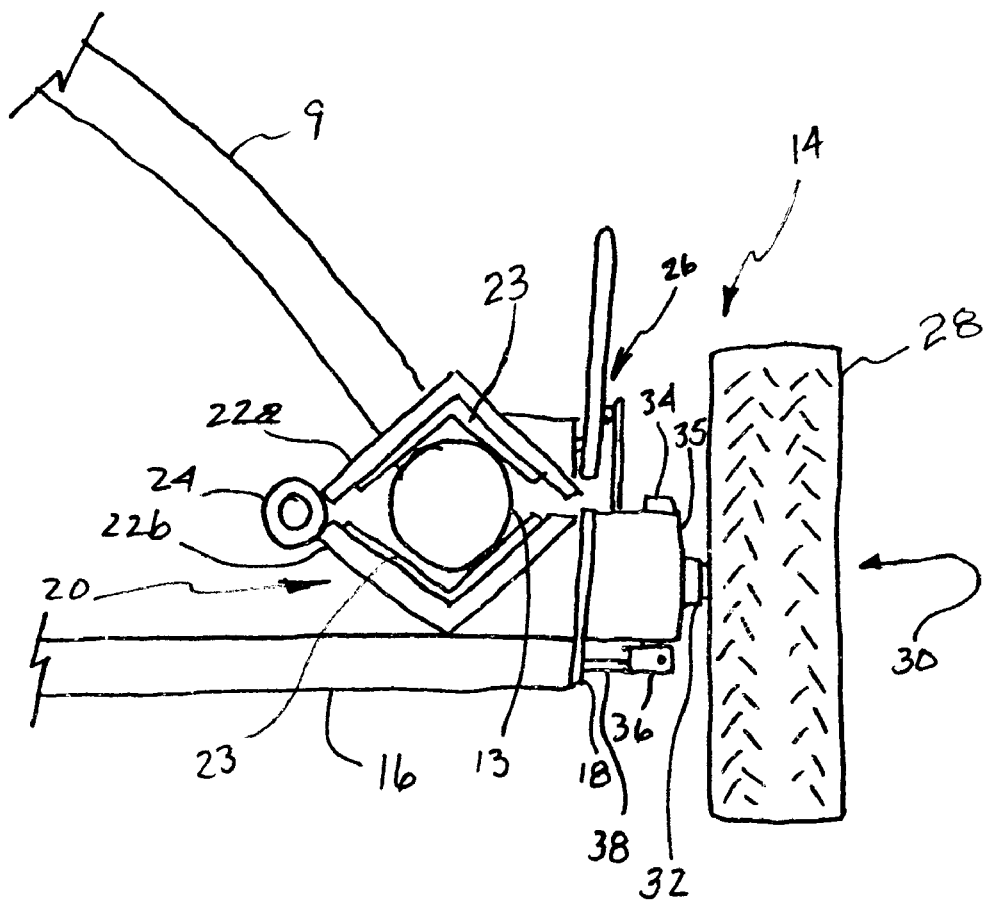
FIG. 2 is a close-up cutaway view of the skid of a helicopter mounted upon the dolly of the present invention.
Figure 3:
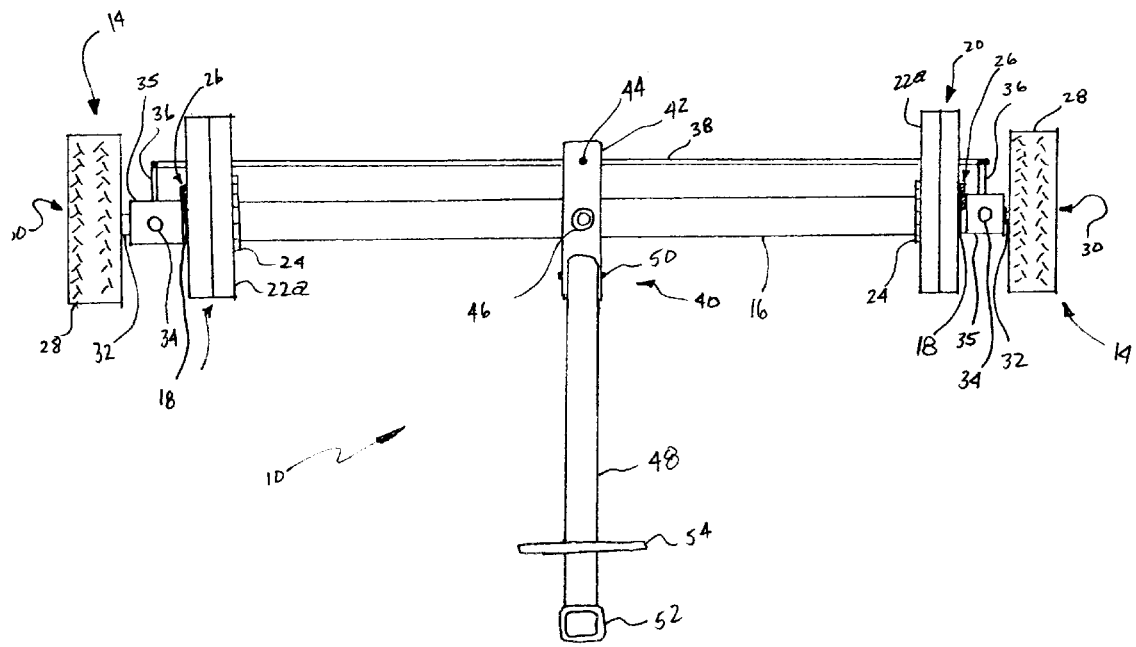
FIG. 3 is a top, plan view of the dolly of the present invention.

As can best be seen in FIGS. 2 and 3, the dolly 10 is comprised of a pair of steerable wheel assemblies 14 mounted to the respective ends of an axle 16. The wheel assemblies 14 are secured to the axle 16 by means of a plate 18 that is bolted or welded therebetween. It is possible to connect the axle 16 directly to the wheel assemblies 14, however by using the plate 18, the axle can be offset toward the ground so as to lower the center of gravity of the dolly 10. This feature is important in that it provides a more stable platform for the helicopter 12 when it is mounted upon the dolly 10.

Clamping assemblies 20 for clamping the skids 13 of the helicopter 12 to the dolly 10 are secured to the dolly adjacent the wheel assemblies 14. The clamping assemblies 20 are preferably comprised of a pair of clamping elements 22a and 22b that are connected to one another by hinge 24. Element 22b is preferably secured as by welding to the axle 16 and, if so desired, to the plate 18 as well. Alternatively, element 22b can be bolted or clamped to the axle 16 so as to allow the clamping assemblies 20 to be secured to the axle 16 in various positions. Hinge 24 is preferably capable of opening 180° in order to allow element 22a to be swung out of the way of a skid 13 that is to be placed in the clamping assembly 20. However, the only requirement is that element 22a must allow a skid 13 to be placed in and removed from the clamping assemblies 20. A locking device 26 is coupled to element 22b for the purpose of securely clamping a skid 13 between clamping elements 22a and 22b. It is preferred to utilize a quick-acting device such as a cam lock or other over-center type locking device, however, any mechanism capable of maintaining the clamping elements 22a and 22b in a closed position such as a screw device, a padlock, a chain, or a lock pin may be utilized. To improve the grip of the clamping assemblies 20 upon the skids 13 of the helicopter 12, the clamping elements 22a and 22b may be lined with a resilient material such as rubber padding 23.

As indicated above, the wheel assemblies 14 are steerable and are comprised of a tire 28 mounted on a rim 30. Rim 30 is in turn secured to a wheel axle 32 that is secured to a vertical spindle 34. Vertical spindle 34 is mounted in a pivot block 35 and is pivotable about a vertical axis and allows the tires 28 to be pivoted to the right and to the left. Pitman arm 36 is connected to vertical spindle 34 for steering the wheel assembly 14 and by rotating the pitman arm 36, the tires 28 are pivoted either right or left, as desired. A linkage 38 connects the pitman arms 36 of each of the wheel assemblies 14 and thereby constrains the wheel assemblies 14 to steer the tires 28 in conjunction with one another. The linkage 38 is actuated by tow bar 40 which is also connected to the axle 16 as seen in FIG. 3. It is advantageous to arrange the position of the pitman arms 36 upon the vertical spindles such that the linkage 38 will be parallel and adjacent the axle 16. In this manner the axle 16 will prevent the linkage from becoming snagged on debris or on the terrain over which the dolly 10 is being moved. It is to be kept in mind that the specific structure of the wheel assemblies 14 described herein is but one of many equivalent structures for a wheel assembly that may be utilized with the present invention.

Tow bar 40 is comprised of an actuating link 42 that is rotatively pinned at 44 to the linkage 38 and to the axle 16 at 46. The connection between the actuating link 42 and the axle 16 at 46 is a structural connection and is preferably made with a suitably large bolt or pin. The connection between the actuating link 42 and the linkage 38 is simply to actuate the wheel assemblies 14 for steering the tires 28 and is typically a smaller pin or bolt. Tongue 48 is hingedly secured to the actuating link 42 by a pin 50 that allows the tongue 48 to be pivoted toward and away from the fuselage of the helicopter 12. While a hinged connection between the tongue 48 and actuating link 42 is not strictly necessary to the operation of the dolly 10, allowing the tongue 48 to be pivoted with respect to the actuating link 42 will prevent the tongue 48 from striking the fuselage of the helicopter 12, thereby avoiding damage and costly repairs to the body and windscreen of the helicopter 12.

The tongue 48 is typically provided with a standard connecting mechanism 52, such as a D-ring, that allows the dolly 10 to be coupled to a towing vehicle (not shown). In addition, the tongue 48 may be provided with a handle 54 that allows a person to pull the dolly 10 by hand.

Figure 4:
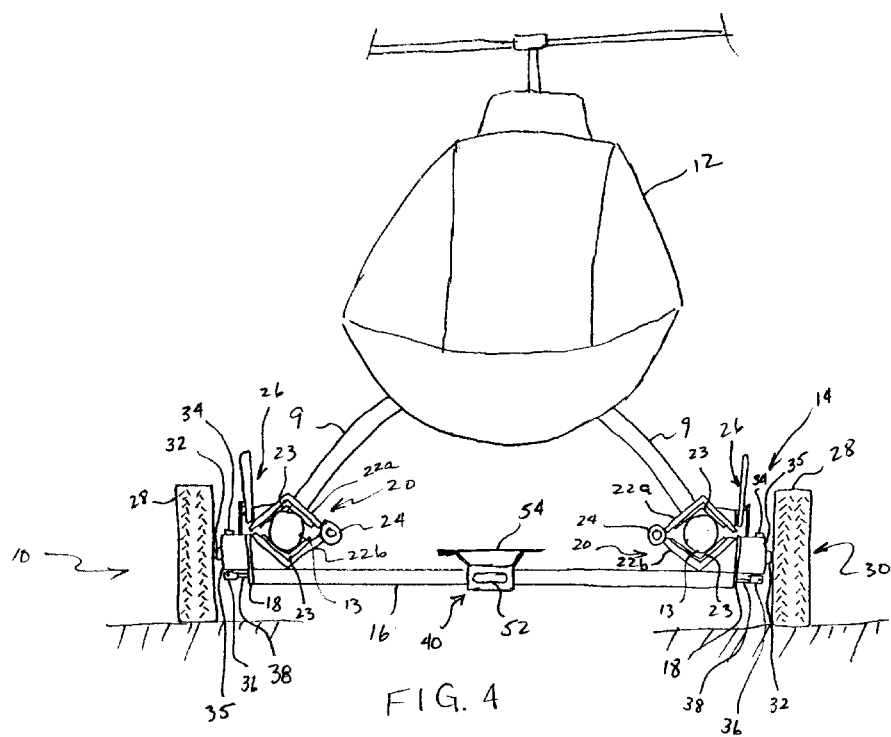
FIG. 4 is a front elevational view of a helicopter mounted upon a dolly constructed according to the present invention.
Figure 6:
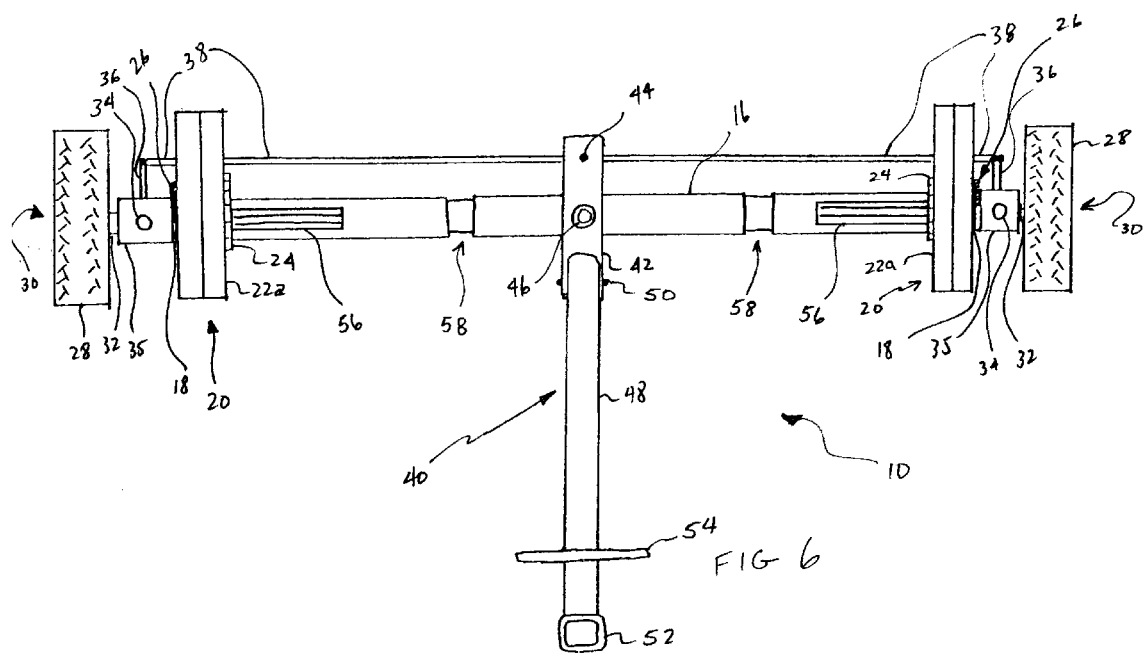
FIG. 6 is a top, plan view of the dolly of FIG. 5.
Figure 5:
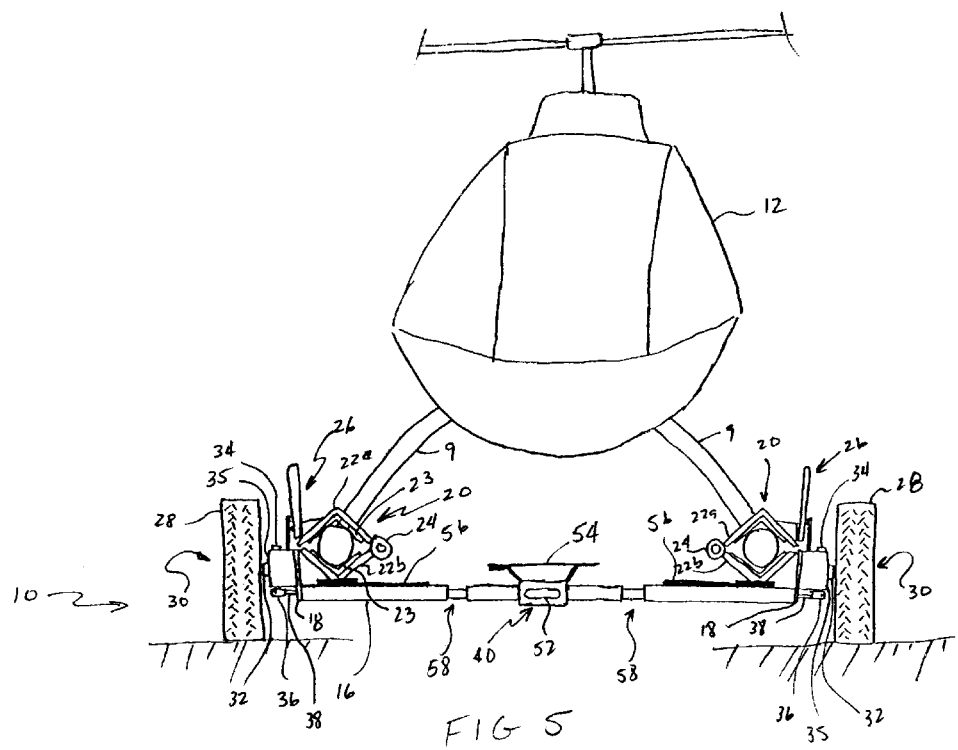
FIG. 5 is a front elevational view of a helicopter mounted in an alternate embodiment of the dolly of the present invention.

As can be appreciated from FIG. 4, the clamping assemblies 20 must be aligned with the skids 13 of the helicopter in order to function properly. As the distance between the skids 13 may vary for different makes and models of helicopters 12, it may be useful to secure the clamping assemblies 20 to the dolly 10 in a manner that allows the clamping assemblies 20 to be adjusted to accommodate the skids 13 of different makes and models of helicopters 12. Alternate embodiments of the present invention that allow for adjusting the distance between the clamping assemblies 20 may be seen in FIGS. 5 and 6. In one embodiment, the clamping assemblies 20 may be slidingly mounted upon a track 56 that would allow the clamping assemblies to be adjusted to accommodate the skids 13 of a given helicopter 12. One or both of the clamping assemblies 20 may be mounted in such a manner. Alternatively, the clamping assemblies 20 may be bolted to the axle 16 in a manner that would allow them to be moved in relation to one another.

In another embodiment, the axle 16 may be of a telescoping nature as illustrated at 58. By varying the length of the axle 16, the distance between the clamping assemblies 20 may be modified. It is to be noted that other means for modifying the distance between the clamping assemblies 20 may also be used without exceeding the scope of this specification. Furthermore, multiple means for modifying the distance between the clamping assemblies 20 may be used simultaneously.

In another embodiment of the present invention, wheel assemblies 14 may be replaced with large swivel wheels capable of swiveling a full 180°. In this alternate embodiment, the linkage 38 may be omitted. Rather than being steerable in the stricter sense, the swivel wheels will allow a helicopter 12 supported on the dolly 10 to be easily turned. While swivel wheels do not provide for as great a control of the dolly in towing, they will allow for much greater maneuverability of a helicopter 12 supported on the dolly.

In operation, a dolly 10 having clamping assemblies appropriately spaced to accommodate the skids 13 of a chosen helicopter 12 is positioned in front of the chosen helicopter 12. Once the dolly 10 is suitably positioned, the helicopter 12 is rotated onto the back portion of its skids 13. This can be accomplished by pushing down on the tail of the helicopter 12 as at 11a or by pushing up on the nose of the helicopter 12 as at 11b. Where the force required to rotate the helicopter 12 onto the rear portion of its skids 13 is too great for a single person, one or more additional persons or a mechanical assist device such as a winch may be used to rotate the helicopter 12 onto the rear of its skids 13. Preferably, the rear portion of the skids 13 of the helicopter 12 will be provided with wheels 8, though the present invention may be utilized with a somewhat lower degree of success with helicopters 12 that are not so equipped.

Once the helicopter 12 has been rotated onto its wheels 8 and clamping elements 22a of clamping assemblies 20 have been rotated to their open positions, the dolly 10 is moved into position beneath the skids 13 of the helicopter 12. Once the dolly 10 has been appropriately positioned, the helicopter 12 is lowered onto clamping elements 22b of the clamping assemblies 20. Clamping assemblies 22a are then rotated into their closed position as illustrated in FIGS. 2 and 4 and secured by actuating the respective locking devices 26. The helicopter 12 is now supported upon the tires 28 of the dolly 10 and upon wheels 8 of the helicopter skids 13 or upon the rear of the skids 13 themselves.

It is preferred to locate the dolly 10 so that the clamping assemblies 20 may engage the skids 13 immediately forward the front struts 9 of the helicopter undercarriage. It is important to note that the dolly 10 may be positioned farther back along the skids if so desired. However, the dolly 10 should never be positioned at or behind the center of gravity of the helicopter 12 as the helicopter will be prone to tipping forward. In general the center of gravity of a helicopter is located along the axis of the main rotor of the helicopter, as illustrated in FIG. 1 at C. Locating the clamping assemblies 20 of the dolly 10 forward of the struts 9 of the helicopter 12 results in a longer and more stable wheelbase upon which the helicopter 12 may be transported.

Once the dolly 10 has been properly secured to the helicopter 12, the tongue 48 may be connected to a towing vehicle with D-ring 52 or may be pulled by a ground crewman using the handle 54. In either case, the helicopter 12 will move easily as the larger diameter of the tires 28 will span bumps or ruts in the surface over which the helicopter is being transported. In addition, the increased surface area of the tires 28 in contact with the ground will also move more easily across softer ground and mud than the smaller wheels 8 could alone. By applying lateral forces to the tow bar 40, the actuating link 42 will cause the linkage 38 to move laterally in a direction opposite to the force applied to the tow bar 40. The lateral movement of the linkage 38 is in turn transmitted to the pitman arms 36 of the wheel assemblies 14, which cause the respective spindles 34 to rotate the tires 28 in the direction in which the lateral force was applied to the tow bar 40. In this manner, the helicopter may be steered as it is towed or transported around the airfield.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A dolly for transporting a helicopter having an undercarriage including a pair of skids on the ground, comprising:
    a pair of steerable wheel assemblies affixed to the respective ends of an axle;
    a pair of clamping assemblies coupled to the axle for securing the skids of the helicopter to the dolly; and,
    a tow bar rotatively coupled to the axle, the tow bar also being coupled to the wheel assemblies so as to steer the wheel assemblies.

2. The dolly for transporting a helicopter of claim 1 wherein the tow bar comprises:
    an actuating link that is rotatively coupled to the axle and to a linkage that is coupled between the wheel assemblies; and,
    a tongue hingedly coupled to the actuating link such that the tongue may pivot toward and away from the helicopter.

3. The dolly for transporting a helicopter of claim 2 wherein the tow bar further comprises at least one of a connecting mechanism and a handle.

4. The dolly for transporting a helicopter of claim 1 wherein the clamping assemblies further comprise:
    a pair of opposable clamping elements, one of the clamping elements being rotatable between a first, open position and a second, closed position, the clamping elements being further constructed and arranged to clamp therebetween the skid of the helicopter when the clamping elements are in their second, closed position; and,
    a locking device for maintaining the clamping elements in their second, closed position.

5. The dolly for transporting a helicopter of claim 1 wherein the clamping elements are adjustably coupled to the axle of the dolly.

6. The dolly for transporting a helicopter of claim 1 wherein the length of the axle is adjustable.

7. The dolly for transporting a helicopter of claim 1 wherein the respective steerable wheel assemblies comprise:
    a tire mounted upon a rim;
    a wheel axle, the rim of the tire being coupled to the wheel axle;
    a vertical spindle, the vertical spindle being rotatable about a vertical axis, the wheel axle being secured to the vertical spindle such that rotation of the vertical spindle causes the tire to be steered in the direction of the rotation of the spindle; and,
    a pitman arm coupled to the vertical spindle for rotating the vertical spindle.

8. The dolly for transporting a helicopter of claim 7 wherein the pitman arms of the respective steerable wheel assemblies are coupled by a linkage that is also coupled to the tow bar.

9. The dolly for transporting a helicopter of claim 7 wherein an axis of the axle of the dolly is vertically offset from an axis passing through the center of the tires of the wheel assemblies.

10. A dolly for transporting a helicopter having an undercarriage including a pair of skids on the ground, comprising:
    a pair of rotatable wheel assemblies affixed to the respective ends of an axle;
    a pair of clamping assemblies coupled to the axle for securing the skids of the helicopter to the dolly; and,
    a tow bar coupled to the axle.

11. The dolly for transporting a helicopter of claim 10 wherein the tow bar comprises:
    an actuating link that is coupled to the axle; and,
    a tongue hingedly coupled to the actuating link such that the tongue may pivot toward and away from the helicopter.

12. The dolly for transporting a helicopter of claim 11 wherein the tow bar further comprises at least one of a connecting mechanism and a handle.

13. The dolly for transporting a helicopter of claim 10 wherein the clamping assemblies further comprise:
    a pair of opposable clamping elements, one of the clamping elements being rotatable between a first, open position and a second, closed position, the clamping elements being further constructed and arranged to clamp therebetween the skid of the helicopter when the clamping elements are in their second, closed position; and,
    a locking device for maintaining the clamping elements in their second, closed position.

14. The dolly for transporting a helicopter of claim 10 wherein the clamping elements are adjustably coupled to the axle of the dolly.

15. The dolly for transporting a helicopter of claim 10 wherein the length of the axle is adjustable.

16. The dolly for transporting a helicopter of claim 10 wherein the wheel assemblies comprise at least one swivel wheel rotatable about a vertical axis through 180°.

17. The dolly for transporting a helicopter of claim 16 wherein an axis of the axle of the dolly is offset from an axis passing through the center of the at least one swivel wheel.

* * * * *